(12) United States Patent
Kimura et al.

(10) Patent No.: US 7,227,093 B2
(45) Date of Patent: Jun. 5, 2007

(54) AUTOMOTIVE WINDSHIELD WIPER SWITCH

(75) Inventors: Yusuke Kimura, Aichi (JP); Isao Maeda, Aichi (JP); Norikazu Yoshida, Aichi (JP); Fumitaka Hayase, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/389,035

(22) Filed: Mar. 27, 2006

(65) Prior Publication Data

US 2006/0214617 A1 Sep. 28, 2006

(30) Foreign Application Priority Data

Mar. 28, 2005 (JP) ............ P. 2005-091576

(51) Int. Cl.
*H01H 9/00* (2006.01)
(52) U.S. Cl. .................. 200/61.54; 307/10.1
(58) Field of Classification Search ........... 200/61.27, 200/61.3, 61.31, 61.54, 17 R, 332, 335, 18; 307/9.1, 10.1, 10.8
See application file for complete search history.

(56) References Cited

U.S. PATENT DOCUMENTS

| 4,328,431 | A | * | 5/1982 | Usami ................... 307/10.1 |
| 5,457,443 | A | * | 10/1995 | Yamauchi et al. ........... 200/4 |
| 5,760,355 | A | * | 6/1998 | Glowczewski et al. .. 200/61.54 |
| 5,981,886 | A | * | 11/1999 | Poleshuk et al. ........ 200/61.39 |
| 6,069,461 | A | * | 5/2000 | Jaworski et al. ........... 318/443 |
| 6,072,295 | A | * | 6/2000 | Kusunoki ................. 318/444 |
| 6,492,744 | B1 | * | 12/2002 | Rudolph et al. .......... 307/10.1 |
| 6,534,732 | B2 | * | 3/2003 | Karasik et al. ......... 200/61.54 |
| 6,548,772 | B2 | * | 4/2003 | Liburdi ................... 200/61.54 |
| 6,614,127 | B1 | * | 9/2003 | Daniels .................... 307/10.1 |

FOREIGN PATENT DOCUMENTS

JP  A-2005-276573  2/2003

* cited by examiner

*Primary Examiner*—Michael A. Friedhofer
(74) *Attorney, Agent, or Firm*—Morgan, Lewis & Bockius LLP

(57) ABSTRACT

Since a MIST position is set to be positioned next to an AUTO position, when a control lever is operated from the AUTO position to the MIST position, the control lever can be so operated through one step without having to pass through another operation mode position, whereby by operating the control lever from the AUTO position to the MIST position to be held operative in the position, the wiper can be put in operation. In addition, by operating the control lever to stay in the AUTO position, the wiper can automatically be put in operation according to the amount of rain.

3 Claims, 5 Drawing Sheets

AUTOMOTIVE WINDSHIELD WIPER SWITCH

BACKGROUND OF THE INVENTION

The present invention relates to an automotive windshield wiper switch which is used to operate a windshield wiper for removing rain drops adhering to the windshield of a vehicle.

Conventionally, there have been provided automotive windshield wiper switches having a MIST function as automotive windshield wiper switches. In, for example, a lever type of automotive windshield wiper switch, this MIST function functions such that when a control lever is operated to a MIST position to be held operative in the position, the operation of a wiper is allowed to continue, whereas when the holding of the control lever in the position is released, the control lever is returned to its original operation mode position and the operation of the wiper is stopped. Using this function, the user can put the wiper in operation only when the operation thereof is needed (refer to, for example, Patent Document No. 1).

Patent Document No. 1: JP-A-2003-276573

FIG. 6 is a drawing which shows the configuration of an automotive windshield wiper switch including the aforesaid type of MIST function. In the automotive windshield wiper switch shown in FIG. 6, a control lever 101 rotates about a rotating axis 102 as a rotating center with an OFF position acting as a base position, and when operated in a counterclockwise direction, the control lever 101 can be operated sequentially to an INT position, a LO position and a HI position in a stepped fashion, whereas when operated in a clockwise direction, the control lever 101 can be operated to a MIST position. In this case, the operation of a windshield wiper is stopped in the OFF position. The wiper is intermittently operated with a predetermined delay between wiper sweeps in the INT position, is operated continuously at low speed in the LO position, and is operated continuously at high speed in the HI position. In addition, as has been described above, in the MIST position, the wiper is operated only when the control lever 101 is operated to be held in this position.

On the other hand, in recent years, with a view to automating the operation and control of the windshield wiper, there have been provided automotive windshield wiper switch having a function to automatically switch on the wiper when a certain amount of rain is detected by providing a rain sensor which detects an amount of rain, for example, with a predetermined sensitivity (an AUTO function). According to the automotive windshield wiper switch having the AUTO function, by operating the control lever into an AUTO position (a position where the operation of the wiper is controlled to the AUTO function) even in such a state that there is no rainfall, the user can have the wiper automatically switched on to start its operation when it starts raining (a certain amount of rain is detected), whereas when it stops raining (no amount of rain comes to be detected), the user can have the wiper automatically switched off to stop its operation without the user switching it on and off every time it starts and stops raining.

FIG. 7 is a drawing which shows the configuration of an automotive windshield wiper switch including this type of AUTO function. Also, in the automotive windshield wiper switch shown in FIG. 7, a control lever 201 can rotate about a rotating axis 202 as a rotating center so as to be operated sequentially into respective operation mode positions in a stepped fashion. In the automotive windshield wiper switch having the AUTO function, the AUTO position is set to be positioned in the INT position in the automotive windshield wiper switch shown in FIG. 6. Here, the reason the AUTO position is set in the INT position shown in FIG. 6 is that the contact of the INT position can continue to be used as it is, in other words, no alteration is necessary for the other positions, and hence, no complexity has to be introduced, allowing the design to remain simple.

In an automotive windshield wiper switch in which the AUTO position is set in the INT position like the one described above, however, the following drawback will be caused. Namely, when the user wants to operate the wiper intentionally although not raining (for example, when the user attempts to remove dirt such as insects and dust which adheres to the windshield to thereby deteriorate the visibility of the user through the windshield), since the attempt can be attained by operating the wiper momentarily, it is considered that the user operates the control lever 201 into the MIST position where the wiper can be operated only while the control lever 201 is operated to be held operative in the position. As this occurs, in the event that the control lever 201 has been operated to be in the OFF position in advance, since the MIST position is set to be positioned next to the OFF position, the control lever 201 can be operated from the OFF position to the MIST position through one step, causing no problem with operability of the control lever 201.

However, in the event that the aforesaid attempt is tried to be attained with the control lever 201 having been operated to be in the AUTO position in advance, since the MIST position is set to be positioned next to the OFF position, that is, the OFF position is set to be positioned between the AUTO position and the MIST position, the user cannot operate the control lever 201 from the AUTO position to the MIST position through one step but has to operate the control lever 201 from the AUTO position to the MIST position via the OFF position through two steps, thus the user being forced to perform a troublesome operation.

Here, in case it is the user's practice to operate the control lever 201 to be in the OFF position, there occurs the aforesaid drawback in no case, however, with such a practice, the user cannot make effective use of the advantage of the AUTO function which can automatically control the operation of the wiper in accordance with the amount of rain.

SUMMARY OF THE INVENTION

The invention is made in view of the situations, and an object thereof is to provide an automotive windshield wiper switch which can make effective use of the advantage of the AUTO function and moreover which can enhance the operability of the control element when it is operated from the AUTO position to the MIST position.

With a view to attaining the object, according to a first aspect of the invention, there is provided 1. An automotive windshield wiper switch comprising a control element which can be operated to a plurality of operation mode positions including at least a MIST position and an AUTO position positioned next to the MIST position, wherein when the control element is operated to the AUTO position, a wiper is automatically operated in accordance with the amount of rain, and wherein when the control element is operated to the MIST position to be held operative in the position, the wiper is put in operation irrespective of an amount of rain, and when the holding of the control element in the MIST position is released, the control element is automatically returned to the AUTO position.

According to a second aspect of the invention, there is provided an automotive windshield wiper switch as set forth in the first aspect of the invention, the plurality of operation mode positions further includes an OFF position in which, when the control element is operated to the OFF position, the operation of the wiper is stopped, and the OFF position is set to be positioned to oppose the MIST position with the AUTO position interposed therebetween.

According to a third aspect of the invention, there is provided an automotive windshield wiper switch as set forth in the second aspect of the invention, wherein the OFF position is set to be positioned to oppose the MIST position with the AUTO position interposed therebetween while being positioned next to the AUTO position.

According to the automotive windshield wiper switch of the first aspect of the invention, since the MIST position is set to be positioned next to the OFF position, being different from the related art automotive windshield wiper switch, when the control element is attempted to be operated from the AUTO position to the MIST position, the control element can be so operated through one step without having to pass through another operation mode position, so that the control element is operated from the AUTO position to the MIST position to be held operative in the position so as to put the wiper in operation. In addition, with the control element operated to be held in the Auto position, the wiper can be automatically switched on or put into operation in accordance with the amount of rain. By adopting this configuration, the advantage of the AUTO function can be utilized effectively, and moreover, the operability resulting when the control element is operated from the AUTO position to the MIST position can be enhanced.

According to the automotive windshield wiper switch of the second aspect of the invention, since the OFF position is set to oppose the MIST position with the AUTO position centered therebetween, when the control element is attempted to be operated from the OFF position to the AUTO position, the control element can be so operated without having to pass through the MIST position, whereby a risk can be avoided that the wiper has to be switched on or put into operation unnecessary due to the control element being operated to the MIST position, and the operability resulting when the control element is operated from the OFF position to the AUTO position can be enhanced.

According to the automotive windshield wiper switch of the third aspect of the invention, since the OFF position is set to oppose the MIST position with the AUTO position centered therebetween while being positioned next to the AUTO position, when the control element is attempted to be operated from the OFF position to the AUTO position, the control element can be so operated through one step without having to pass through another operation mode position, whereby not only can an a risk be avoided that the control element has to pass through the other operation mode position which eventually triggers an unnecessary operation of the wiper but also the operability resulting when the control element is operated from the OFF position to the AUTO position can be enhanced further.

DETAILED DESCRIPTION OF PREFERRED EMBODIMENTS

First Embodiment

Figure 1:
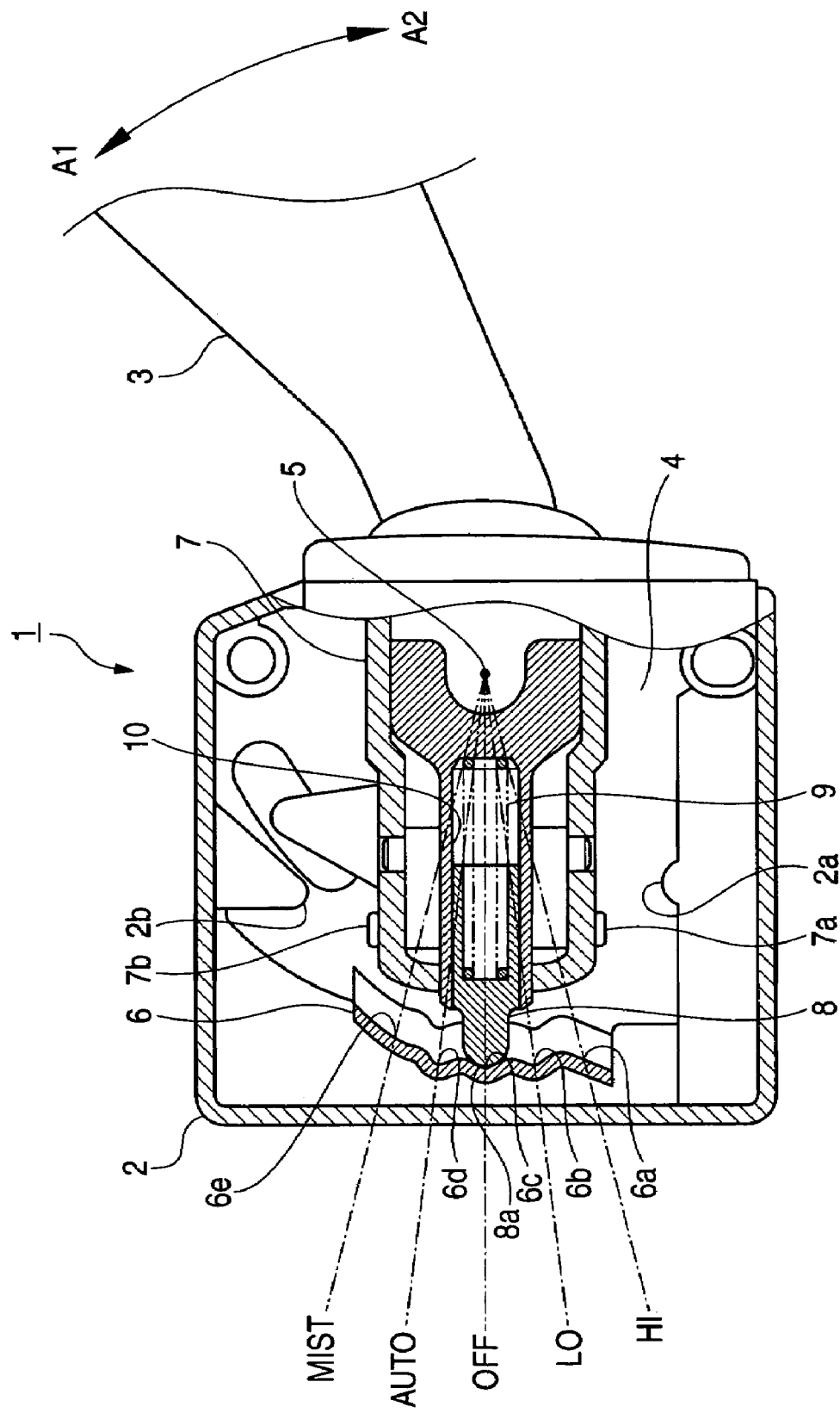
FIG. 1 is a longitudinal sectional view showing a first embodiment of the invention, which shows a state in which a control lever is operated to be in an OFF position.
Figure 2:
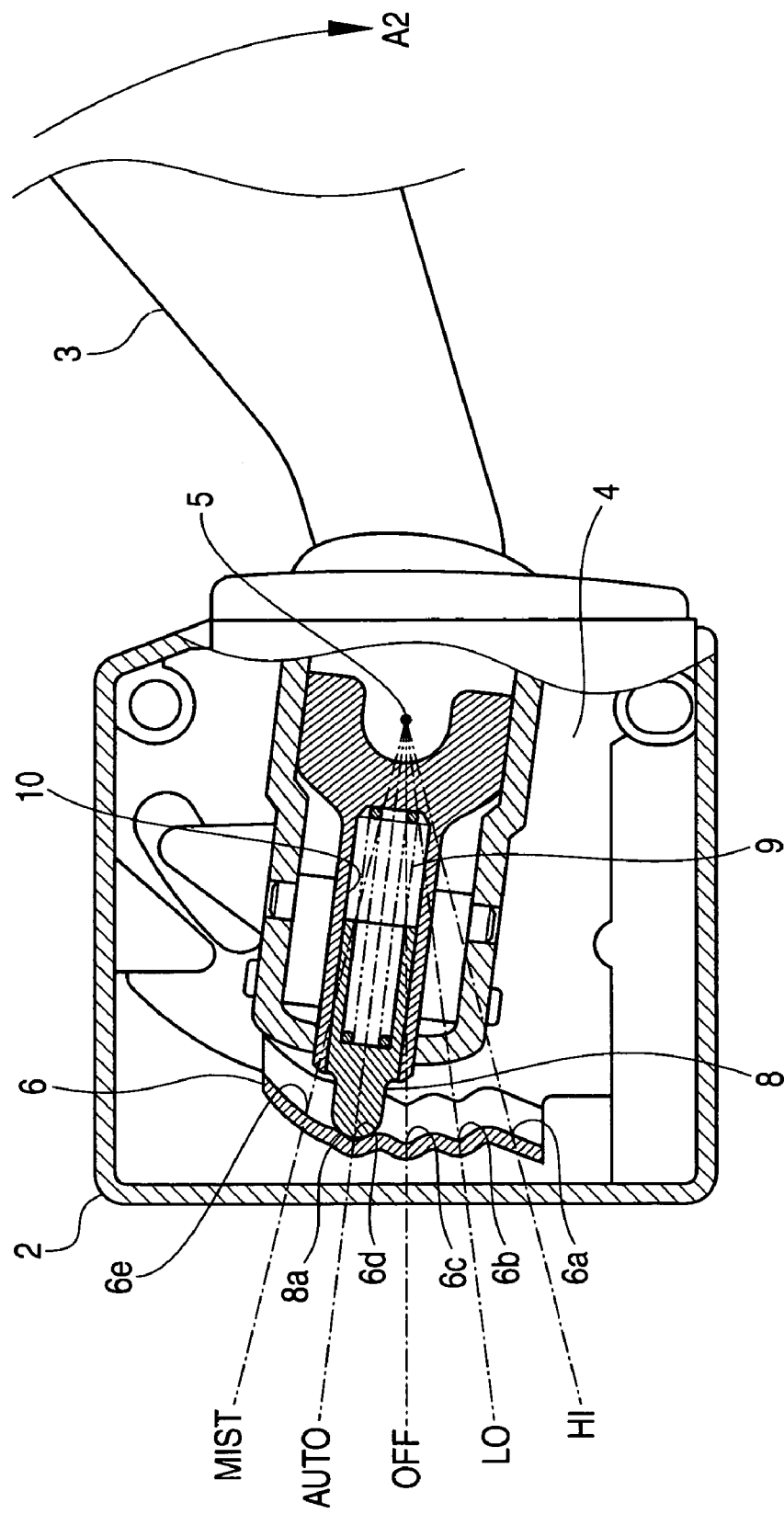
FIG. 2 is a longitudinal sectional view which shows a state in which the control lever is operated to be in an AUTO position.
Figure 3:
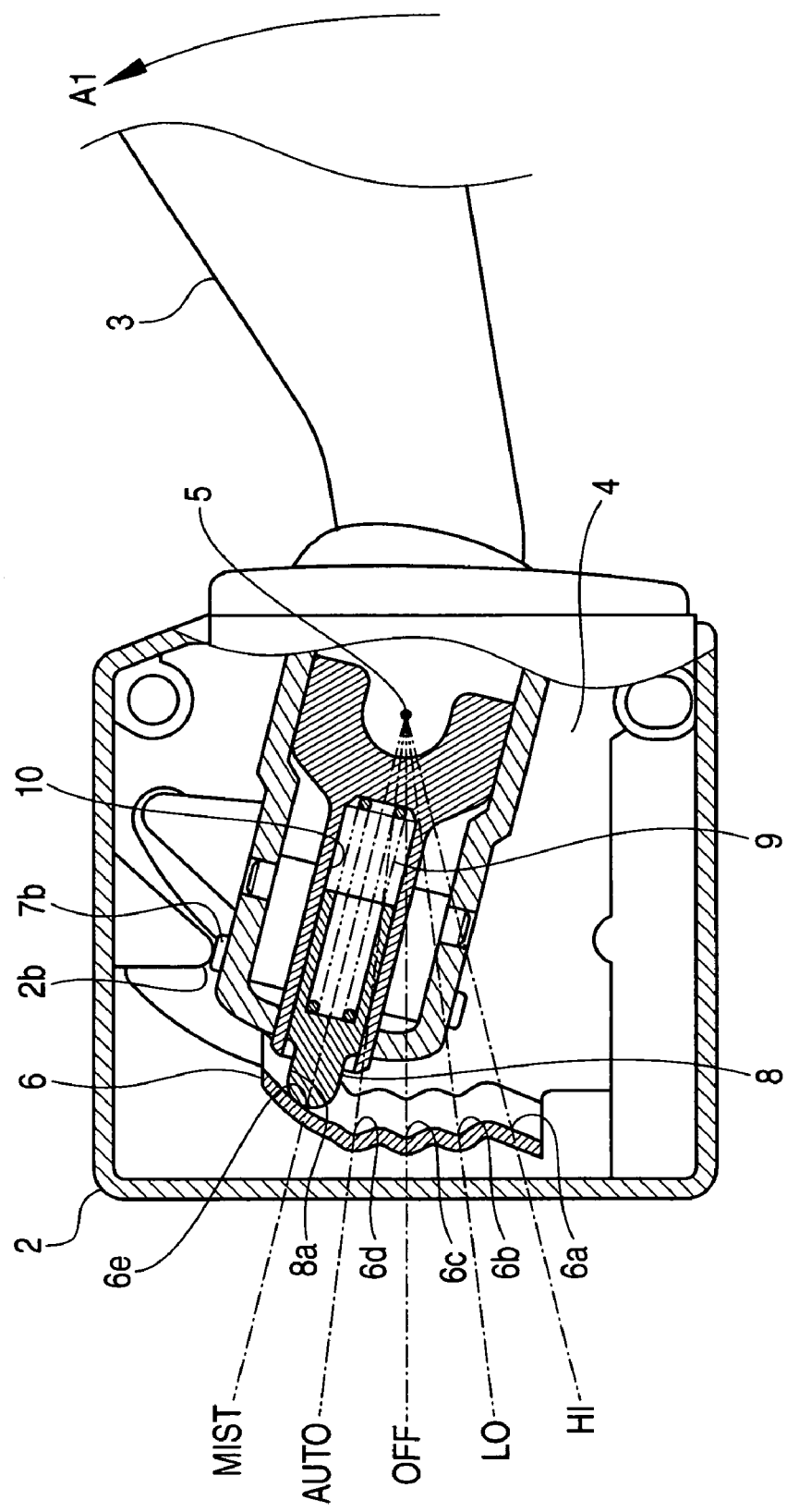
FIG. 3 is a longitudinal sectional view which shows a state in which the control lever is operated to be in a MIST position.

Hereinafter, referring to FIGS. 1 to 3, a first embodiment of the invention will be described in which the invention is applied to a lever type of automotive windshield wiper switch which controls the operation of a windshield wiper by oscillating or rotating a control lever. In FIG. 1, an automotive windshield wiper switch 1 is configured so as to include a case 2 and a control lever 3 (referred to as the control element in the invention).

The case 2 is provided on a steering column portion (not shown) below a steering wheel (not shown). A lever support portion 4 is formed at an end portion (to the right as viewed in FIGS. 1 to 3) of the case 2, whereby an end portion of the control lever 3 is supported in such a manner that the control lever 3 rotates about a rotating axis 5 as a rotating center in directions indicated by arrows A1, A2 shown in FIGS. 1 to 3. On the other hand, a click stop member 6 is provided at the other end portion (to the left as viewed in FIGS. 1 to 3) of the case 2, and a slope portion which corresponds to a HI position or HI position slope portion 6a, a groove portion which corresponds to a LO position or LO position groove portion 6b, a groove portion which corresponds to an OFF position or OFF position groove portion 6c, a groove portion which corresponds to an AUTO position or AUTO position groove portion 6d and a slope portion which corresponds to a MIST position or MIST position slope portion 6e are sequentially formed on the click stop member 6 in such a manner as to correspond to the rotation of the control lever 3 about the rotating axis 5 as the rotating center.

A bracket 7 is provided in such a manner as to rotate together with the control lever 3 about the rotating axis 5 as the rotating center, and in the interior of the bracket 7, a click stop piece 8 is accommodated in a click stop piece accommodating portion 10 in such a state as to be biased towards the click stop member 6 side by means of a compressed coil spring 9. In this case, a distal end portion 8a of the click stop piece 8 is formed into a curved surface so as to slide on the HI position slope portion 6a, the LO position groove portion 6b, the OFF position groove portion 6c, the AUTO position groove portion 6d and the MIST position slope portion 6e in response to the rotation of the control lever 3 about the rotating axis 5 as the rotating center.

In the configuration that has just been described above, when the distal end portion 8a of the click stop piece 8 is moved in a counterclockwise direction (the direction indicated by the arrow A1 in FIG. 1) from a state in which the distal end portion 8a is locked in the OFF position groove portion 6c, or the control lever 3 is rotated in the counterclockwise direction from a state in which the control lever 3 is operated to be in the OFF position so as to be operated into the LO position, the distal end portion 8a is moved from the OFF position groove portion 6c to the LO position groove portion 6b to be locked therein. When the control lever 3 is further rotated in the counterclockwise direction from this state so as to be operated into the HI position, the distal end portion 8a is moved from the LO position groove portion 6b to the HI position slope portion 6a, and as this occurs, a raised portion 7a formed on the bracket 7 is brought into abutment with a raised portion 2a formed in an interior of the case 2, whereby the distal end portion 8a is locked thereat.

On the other hand, when the control element 3 is rotated in a clockwise direction (the direction indicated by the arrow A2 in FIG. 1) from the state in which the control lever 3 is operated to be in the OFF position so as to be operated into the AUTO position, the distal end portion 8a of the click stop piece 8 is moved from the OFF position groove portion 6c to the AUTO position groove portion 6d to be locked therein. When the control lever 3 is rotated further in the clockwise direction from this state so as to be operated into the MIST position (on the periphery of a position where a raised portion 7b formed on the bracket 7 is brought into abutment with a raised portion 2b formed in the interior of the case 2), the distal end portion 8a of the click stop piece 8 is moved from the AUTO position groove portion 6d to the MIST position slope portion 6e. In this case, the distal end portion 8a is not locked on the MIST position slope portion 6e but is moved to the AUTO position groove portion 6d to be locked therein when the holding of the control lever 3 in the MIST position is released. Namely, the control lever 3 is automatically returned to the AUTO position when it is released from the fulfilled operation.

The raised portions 7a, 7b and raised portions 2a, 2b also have functions as stoppers for restricting the rotation of the operation lever 3, whereby the counterclockwise rotation of the control lever 3 is restricted at the position where the raised portion 7a is brought into abutment with the raised portion 2a, whereas the clockwise rotation of the control lever 3 is restricted at the position where the raised portion 7b is brought into abutment with the raised portion 2b.

In addition, a contact of a switching portion (not shown) is designed to be switched accordingly in response to the operation of the control lever 3 into the OFF position, LO position, HI position, AUTO position and MIST position, so as to control the operation of a windshield wiper. To be specific, in the OFF position, the contact is switched to a position which stops the operation of the wiper. In addition, of the operation mode positions which are set in the counterclockwise direction from the OFF position which functions as the base position, in the LO position, the contact is switched to a position which operates the wiper at low speed, and in the HI position, the contact is switched to a position which operates the wiper at high speed. In contrast, of the operation mode positions which are set in the clockwise direction from the OFF position which functions as the base position, in the AUTO position, the contact is switched to a position which automatically controls the operation of the wiper by means of a rain sensor (not shown) which detects the amount of rain with a predetermined sensitivity, and in the MIST position, the contact is switched to a position which switches on or puts the wiper in operation only while the control lever 3 is operated to be in this position.

Next, referring to FIGS. 2 and 3, the function of the configuration that has just been described above will be described. When the control lever 3 is operated to be in the OFF position (refer to FIG. 1), the user has to operate the control lever 3 so as to be switch on and off the wiper every time it starts and stops raining, which is troublesome.

Then, it is considered that although not raining, the user operates in advance the control lever 3 into the AUTO position (in the direction indicated by the arrow A2 in FIG. 1) where the operation of the wiper is automatically controlled. FIG. 2 shows a state in which the control lever 3 is operated to be in the AUTO position. In the AUTO position, since the wiper is automatically switched on when a predetermined amount of rain is detected, the wiper is allowed to be switched on automatically when it starts to rain, whereas when it stops raining, the operation of the wiper can automatically be stopped, whereby the user does not have to operate the control lever 3 every time it starts and stops raining.

Incidentally, although not raining, the visibility of the user is deteriorated when dirt such as insects and dust adheres to the windshield, and hence, there occurs a case where the user wants to put the wiper in operation intentionally to sweep the windshield so as to remove the dirt therefrom. In the AUTO position, however, the wiper cannot be put in operation until the amount of rain is detected with the predetermined sensitivity. On the other hand, in the LO position and HI position, not only is the wiper operated continuously to thereby be operated to an unnecessary extent but also the control lever 3 has to be operated to the LO position and HI position through two and three steps, which is troublesome.

Then, the user operates the control lever 3 (in the direction indicated by the arrow A2 in FIG. 2) to the MIST position to be held operative in the position, where the wiper can be put in operation only while the control lever 3 is held in operation. FIG. 3 shows a state in which the control lever 3 is operated to the MIST position so as to be held therein. As has been described above, the wiper is allowed to operate while the control lever 3 is operated to be held in this state. Namely, since the wiper is allowed to operate irrespective of amount of rain in this state, the user operates the control lever 3 to the MIST position to be held therein so as to put the wiper in operation to remove the dirt on the windshield. Then, when the user confirms that the dirt on the windshield has been removed by the wiper to thereby get back a sufficient visibility, the user releases the holding of the control lever 3 in this position. The control lever 3 released from the held position where it has fulfilled the aimed operation is automatically returned to the AUTO position (in the direction indicated by the arrow A1 in FIG. 3), resulting again in the state in which the operation of the wiper is controlled depending on the amount of rain (refer to FIG. 2).

Note that the click stop member 6 is curved in a direction (not shown, hereinafter, referred to as a pull-up direction) which intersects with the directions indicated by the arrows A1, A2 in FIG. 1 at right angles, and the HI position slope portion 6a, the LO position groove portion 6b, the OFF position groove portion 6c, the AUTO position groove position 6d and the MIST position slope portion 6e are formed along a curved surface of the curved click stop member 6, respectively. In addition, to correspond to this configuration, the control lever 3 is also supported in such a manner as to be rotated in the pull-up direction. Namely, the control lever 3 can be operated to the respective operation mode positions aligned in the directions indicated by the arrows A1, A2 in FIG. 1 in a similar fashion to that described above even in such a state that the lever is being operated in the pull-up direction.

Thus, as has been described heretofore, according to the first embodiment of the invention, in the lever type of automotive windshield wiper switch in which the operation of the windshield wiper is controlled by rotating the control lever 3, since the MIST position is set to be positioned next to the AUTO position, being different from the related art automotive windshield wiper switch, when the control lever 3 is operated from the AUTO position to the MIST position, the control lever 3 can be so operated through one step without having to pass through another operation mode position, whereby by operating the control lever 3 from the AUTO position to the MIST position to be held operative in the position, the wiper can be put in operation. In addition, by operating the control lever 3 to stay in the AUTO position, the wiper can automatically be put in operation according to the amount of rain, whereby the advantage of the AUTO function can be utilized effectively, and moreover, the operability resulting when the control lever 3 is operated from the AUTO position to the MIST position can be enhanced.

In addition, since the OFF position is set to be positioned to a side of the AUTO position which is opposite to a side thereof which faces the MIST position while being positioned next to the AUTO position, when the control lever 3 is operated from the OFF position to the AUTO position, the control lever 3 can be so operated through one step without having to pass through the mist position or another operation mode position, whereby not only can the risk be avoided that the operation of the control lever 3 to the MIST position or the other operation mode position triggers an unnecessary operation of the wiper but also the operability resulting when the control lever 3 is operated from the OFF position to the AUTO position can also be enhanced.

Figure 6:
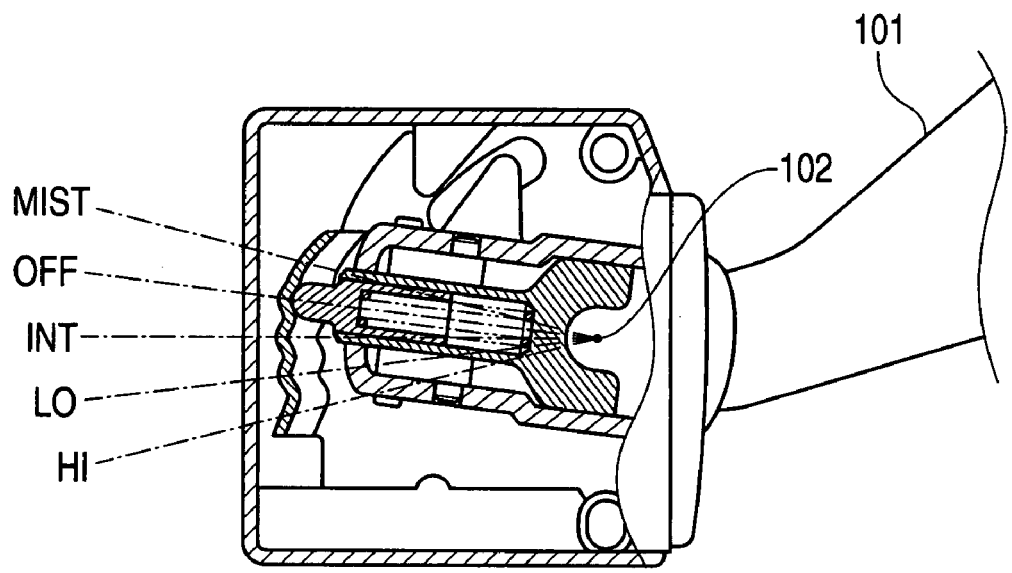
FIG. 6 is a longitudinal sectional view which shows the configuration of a related art automotive windshield wiper switch having an INT position.
Figure 7:
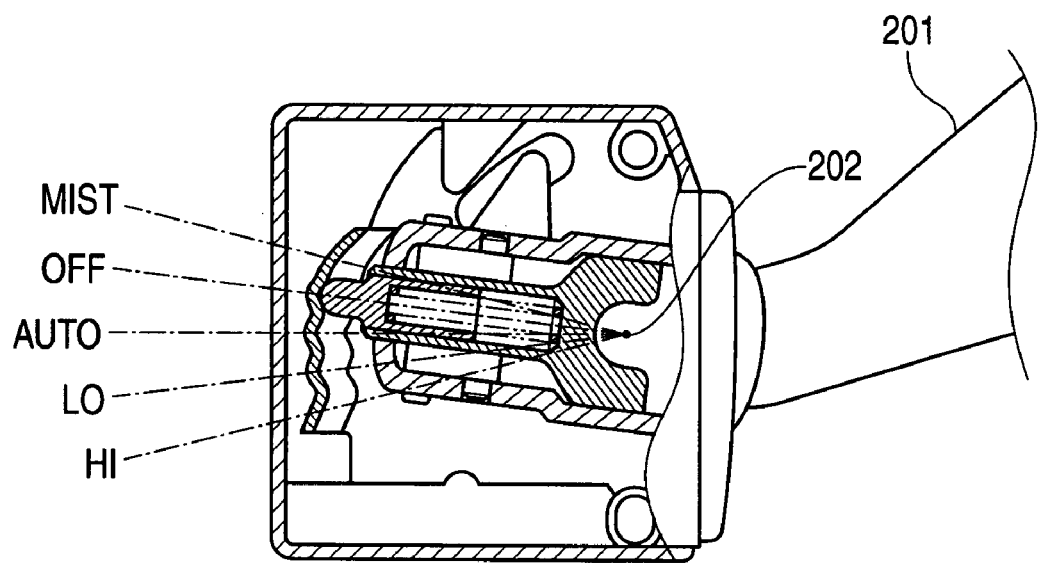
FIG. 7 is a longitudinal sectional view which shows the configuration of a related art automotive windshield wiper switch having an AUTO position.

Furthermore, in the embodiment of the invention, when comparing to the configuration according to the related art shown in FIGS. 6 and 7, the invention can be realized without altering the layout of the groove portions and the slope portions thereof, providing another advantage that the mechanical construction of the related art's configuration can be applied to the invention as they are.

Second Embodiment

Next, a second embodiment of the invention will be described by reference to FIG. 4. Note that portions which are different from those described in the first embodiment will be described, the description of like portions to those of the first embodiment being omitted. While the first embodiment relates to the lever type of automotive windshield wiper switch in which the operation of the windshield wiper is controlled by oscillating or rotating the control lever 3, in this second embodiment, the invention is applied to a rotary type of automotive windshield wiper switch in which the operation of a windshield wiper is controlled by rotating a control knob attached to a distal end portion of a control lever.

Figure 4:
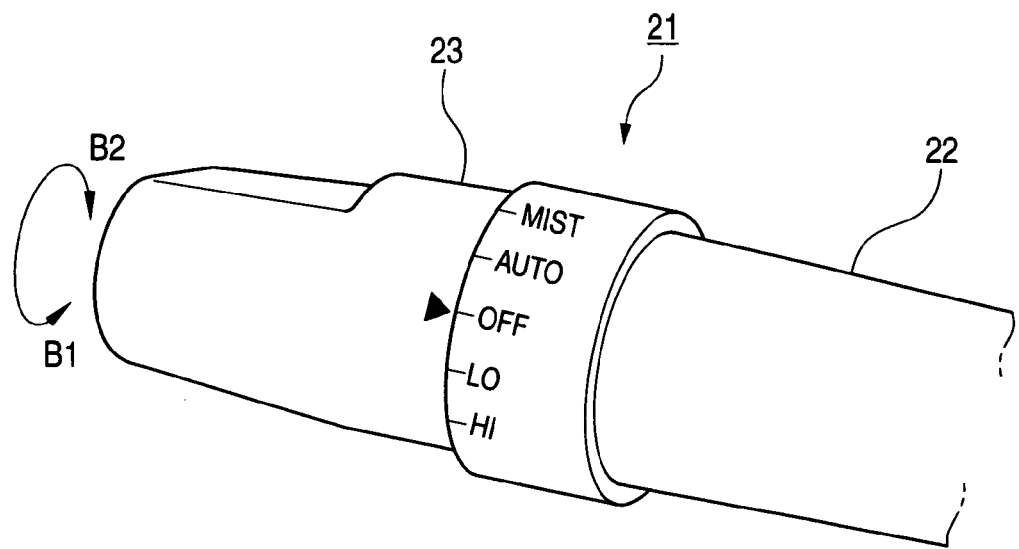
FIG. 4 is a perspective view which shows a second embodiment of the invention.

Namely, in FIG. 4, a rotary type of automotive windshield wiper switch 21 is configured such that a control knob 23 (in the invention, referred to as the control element) is attached to a distal end portion of a control lever 22 in such a manner as to be rotated relative to the control lever 22 in directions indicated by arrows B1, B2 in FIG. 4. In this event, too, with an OFF position regarded as functioning as a base operation mode position, the control knob 23 is designed to be sequentially operated to a LO position and a HI position in a stepped fashion in the direction indicated by the arrow B1, whereas in the direction indicated by the arrow B2, the control knob 23 is designed to be sequentially rotated to an AUTO position and a MIST position in a stepped fashion. In addition, in the MIST position, as with the MIST position described in the first embodiment, when the control knob 23 is operated to this position and is then held operative in the position, the windshield wiper is allowed to operate irrespective of amount of rain, whereas when the holding of the control knob 23 in operation in the position is released, the control knob 23 is designed to be automatically returned to its original operation mode position, that is, the AUTO position.

According to this configuration, when there occurs a case where the user wants to put the wiper in operation intentionally while the control knob 23 is operated to be in the AUTO position in advance, the user operates the control knob 23 to the MIST position to be held in operation in the position. Since the wiper is allowed to operate while the control knob 23 is held in operation in the MIST position, the user continues to hold the control knob 23 in operation in the MIST position until the purpose can be fulfilled, and when he or she confirms that the purpose has been fulfilled, the user releases the holding of the control knob 23 in operation in the position, whereby the control knob 23 so released is automatically returned to the AUTO position, the control of the operation of the wiper depending on amount of rain being thereby resumed.

Thus, as has been described heretofore, according to the second embodiment of the invention, also in the rotary type of automotive windshield wiper switch in which the operation of the wiper is controlled by rotating the control knob 23 attached to the distal end portion of the control lever 22, since the MIST position is set to be positioned next to the AUTO position, similar to what is described in the first embodiment described above, the advantage of the AUTO function can be utilized effectively, and moreover, the operability resulting when the control knob 23 is operated from the AUTO position to the MIST position can be enhanced.

In addition, since the OFF position is set to be positioned to a side of the AUTO position which is opposite to a side thereof which faces the MIST position while being positioned next to the AUTO position, in a case where the control knob 23 is operated from the OFF position to the AUTO position in a similar fashion to that described in the first embodiment, not only can the risk be avoided that the control knob 23 is operated to the MIST position or another operation mode position to thereby trigger an unnecessary operation of the wiper but also the operability resulting when the control knob 23 is operated from the OFF position to the AUTO position can also be enhanced.

Next, a third embodiment of the invention will be described by reference to FIG. 5. Note that, also in this embodiment, portions which are different from those described in the first embodiment will be described, the description of like portions to those of the first embodiment being omitted. In this third embodiment, the invention is applied to a rotary type of automotive windshield wiper switch in which the operation of a windshield wiper is controlled by rotating a control knob mounted on an instrument panel.

Figure 5:
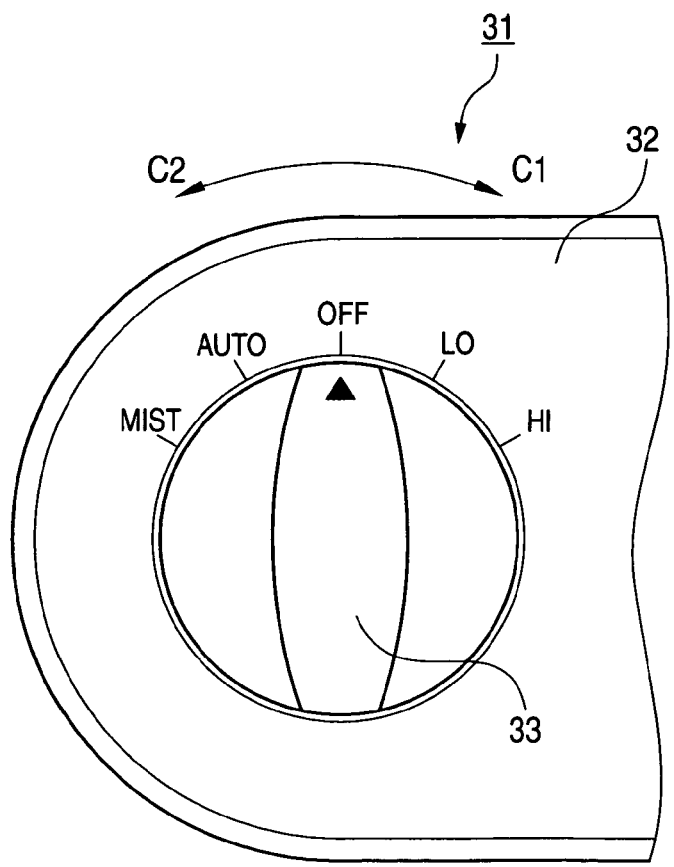
FIG. 5 is a front view which shows a third embodiment of the invention.

Namely, in FIG. 5, a rotary type of automotive windshield wiper switch 31 is configured such that a control knob 33 (in the invention, referred to as the control element) is mounted on an instrument panel 32 in such a manner as to be rotated in directions indicated by arrows C1, C2 in FIG. 5. Also, in this event, with an OFF position regarded as functioning as a base operation mode position, the control knob 33 is designed to be sequentially operated to a LO position and a HI position in a stepped fashion in the direction indicated by the arrow C1, whereas in the direction indicated by the arrow C2, the control knob 33 is designed to be sequentially rotated to an AUTO position and a MIST position in a stepped fashion. In addition, in the MIST position, as with the MIST position described in the first embodiment, when the control knob 33 is operated to this position and is then held operative in the position, the windshield wiper is allowed to operate irrespective of amount of rain, whereas when the holding of the control knob 33 in operation in the position is released, the control knob 33 is designed to be automatically returned to its original operation mode position, that is, the AUTO position.

According to this configuration, when there occurs a case where the user wants to put the wiper in operation intentionally while the control knob 33 is operated to be in the AUTO position in advance, the user operates the control knob 33 to the MIST position to be held in operation in the position. Since the wiper is allowed to operate while the control knob 33 is held in operation in the MIST position, the user continues to hold the control knob 33 in operation in the MIST position until the purpose can be fulfilled, and when he or she confirms that the purpose has been fulfilled, the user releases the holding of the control knob 33 in operation in the position, whereby the control knob 33 so released is automatically returned to the AUTO position, the control of the operation of the wiper depending on amount of rain being thereby resumed.

Thus, as has been described heretofore, according to the third embodiment of the invention, also in the rotary type of automotive windshield wiper switch in which the operation of the wiper is controlled by rotating the control knob 33 mounted on the instrument panel 32, since the MIST position is set to be positioned next to the AUTO position, similar to what is described in the first embodiment described above, the advantage of the AUTO function can be utilized effectively, and moreover, the operability resulting when the control knob 33 is operated from the AUTO position to the MIST position can be enhanced.

In addition, since the OFF position is set to be positioned to a side of the AUTO position which is opposite to a side thereof which faces the MIST position while being positioned next to the AUTO position, in a case where the control knob 33 is operated from the OFF position to the AUTO position in a similar fashion to that described in the first embodiment, not only can the risk be avoided that the control knob 33 is operated to the MIST position or another operation mode position to thereby trigger an unnecessary operation of the wiper but also the operability resulting when the control knob 33 is operated from the OFF position to the AUTO position can also be enhanced.

Other Embodiments

The invention is not limited to the respective embodiments that have been described heretofore but may be modified or expanded as will be described below.

A configuration may be adopted in which an OFF switch is provided for the automotive windshield wiper switch itself, so as to stop the operation of a windshield wiper by this OFF switch. In the event, a configuration may be adopted in which there is set no OFF position which stops the operation of the wiper.

As long as the MIST position is set to be positioned next to the AUTO position, a configuration may be adopted in which the layout of the other operation mode positions is altered, the other operation mode position or positions are deleted or an additional operation mode position or positions are newly added.

What is claimed is:

1. An automotive windshield wiper switch comprising a control element which can be operated to a plurality of operation mode positions including at least a MIST position and an AUTO position positioned next to the MIST position,
wherein when the control element is operated to the AUTO position, a wiper is automatically operated in accordance with an amount of rain, and
wherein when the control element is operated to the MIST position to be held operative in the MIST position, the wiper is put in operation irrespective of an amount of rain, and when the holding of the control element in the MIST position is released, the control element is automatically returned to the AUTO position.

2. The automotive windshield wiper switch according to claim 1, wherein
the plurality of operation mode positions further includes an OFF position in which, when the control element is operated to the OFF position, the operation of the wiper is stopped, and
the OFF position is set to be positioned to oppose the MIST position with the AUTO position interposed therebetween.

3. The automotive windshield wiper switch according to claim 2, wherein the OFF position is set to be positioned to oppose the MIST position with the AUTO position interposed therebetween while being positioned next to the AUTO position.

* * * * *